(12) United States Patent  (10) Patent No.: US 8,695,934 B2
Jensen  (45) Date of Patent: Apr. 15, 2014

(54) REMOTE CONTROL UNIT WALL DOCKING SYSTEM

(75) Inventor: Bradford B. Jensen, St. Joseph, MI (US)

(73) Assignee: Palm Coast Imports LLC TN (US)

( * ) Notice: Subject to any disclaimer, the term of this patent is extended or adjusted under 35 U.S.C. 154(b) by 265 days.

(21) Appl. No.: 13/317,569

(22) Filed: Oct. 21, 2011

(65) Prior Publication Data

US 2012/0104197 A1    May 3, 2012

Related U.S. Application Data

(60) Provisional application No. 61/409,839, filed on Nov. 3, 2010.

(51) Int. Cl.
*H01H 9/02* (2006.01)
*H04Q 9/00* (2006.01)

(52) U.S. Cl.
USPC .. 248/205.1; 248/309.1; 341/22; 340/815.69; 320/114

(58) Field of Classification Search
USPC ............ 248/205.1, 309.1, 309.4; 340/815.69; 341/22; 320/114, 115
See application file for complete search history.

(56) References Cited

U.S. PATENT DOCUMENTS

| | | | |
|---|---|---|---|
| 2,659,169 A | 5/1951 | Brennan | |
| 2,742,250 A | 4/1956 | Cronberger | |
| 2,967,038 A | 1/1961 | Lennemann | |
| 3,031,799 A | 5/1962 | Bradsby | |
| 3,713,614 A | 1/1973 | Taylor | |
| 4,678,150 A | 7/1987 | Newman et al. | |
| 4,745,397 A * | 5/1988 | Lagerbauer et al. | 341/23 |
| 4,875,654 A | 10/1989 | Chandonnet et al. | |
| 5,055,977 A * | 10/1991 | Acquanetta | 362/23 |
| 5,458,311 A * | 10/1995 | Holbrook | 248/309.1 |
| 5,977,901 A * | 11/1999 | Fenner | 341/176 |
| 6,305,656 B1 | 10/2001 | Wemyss | |
| 8,234,509 B2 * | 7/2012 | Gioscia et al. | 713/300 |
| 8,330,638 B2 * | 12/2012 | Altonen et al. | 341/176 |
| 2010/0225499 A1 * | 9/2010 | Peh et al. | 340/815.69 |
| 2011/0267802 A1 * | 11/2011 | Petrillo | 362/85 |

FOREIGN PATENT DOCUMENTS

| | | | | |
|---|---|---|---|---|
| EP | 2387918 A1 * | 11/2011 | | |
| JP | 08102986 A * | 4/1996 | | H04Q 9/00 |

OTHER PUBLICATIONS

Minka Group, "ecatalog," p. 108 http://dealer.minkagroup.net/ecatalog/AIR2011v23v4/index.html, Oct. 2011.

(Continued)

*Primary Examiner* — Anita M King
(74) *Attorney, Agent, or Firm* — George Pappas

(57) ABSTRACT

A detachable magnetic docking system for a handheld device comprises a docking plate having a major surface and a shell for the handheld device having a reverse surface. The major surface and the reverse surface are contoured to mate when adjacent one another to align the shell over the docking plate. Cooperative magnetic elements are located in the docking plate and in the shell to retain the handheld device on the docking plate. The contour of the major surface includes a recessed area. The handheld device having internal battery compartments located adjacent non-recessed areas of the major surface.

5 Claims, 10 Drawing Sheets

(56) References Cited

OTHER PUBLICATIONS

Hunter Fan Model 27187 http://www.hunterfan.com/Products/Accessories/Ceiling-Fans/Controls/Fan-Light-remote-Control-for-Hunter-Original-fans-27187, Sep. 2011.

Craftmade Ceiling Fan Remote Control Conversion Kit http://www.destinationlighting.com/storeitem.jhtml?iid=5242&utm_source=Froogle&utm_medium=CSE&utm_campaign=InHouse, Sep. 2011.

Emerson SR650 Fan Control http://www.emersonfans.com/Pages/Accessory.aspx?Name=Controls&Item=SR650, Sep. 2011.

Savoy House Hand Held Fan Remote Control—RMT002 http://www.wayfair.com/Savoy-House-Programmable-Thermostatic-Hand-Held-Fan-Remote-Control-RMT002-SOY4281.html, Sep. 2011.

* cited by examiner

REMOTE CONTROL UNIT WALL DOCKING SYSTEM

PRIORITY CLAIM

This application claims priority based on U.S. Provisional Application Ser. No. 61/409,839 filed 3 Nov. 2010 titled "Remote control with magnetic wall mounting system."

BACKGROUND

1. Technical Field

The disclosure relates to wall mounted magnetic support arrangements for articles.

2. General Description of the Problem

The use of magnets to support articles from a wall or other vertically oriented surface is well known. It is usual to integrate a magnet into either the article to be supported or to affix the magnet to the wall, and then place an element made of a magnetically susceptible material, such as iron, in the article or on the vertical surface. When the article is brought into proximity of the magnetic element fixed to the vertical surface the magnetic attraction between magnetic elements in or on the article and surface operates to hold the article in place.

The utility of locating frequently used articles on walls is attested to by the number of patents directed to such systems. U.S. Pat. No. 3,713,614 to E. Taylor summarized various issues to be addressed in such arrangements. One issue was that of poor alignment of the magnetic elements, which could lead articles being jarred loose. Taylor addressed the issue by providing a wall mounted bracket made of a magnetizable material. The bracket had three flanges with the flanges pointing outwardly from the surface/base wall. A flashlight was modified to house a magnet in a rectangular structure located outside the flashlight's shell. The rectangular structure fitted within the flanges of the wall mounted bracket bringing the magnetic elements into contact to hold the flashlight in place.

If a supported article is frequently in use, and the location of the system is in an exposed location, the provision of an exposed metal bracket on a wall may be seen as obtrusive.

SUMMARY

A detachable magnetic docking system for a handheld device comprises a docking plate having a major surface and a shell for the handheld device having a reverse surface. The major surface and the reverse surface are contoured to mate when adjacent one another to align the shell over the docking plate. Cooperative magnetic elements are located in the docking plate and in the shell to retain the handheld device on the docking plate. The contour of the major surface includes a recessed area. The handheld device having internal battery compartments located adjacent non-recessed areas of the major surface.

The docking plate resembles a conventional wall switch cover plate when the remote control unit is removed.

DETAILED DESCRIPTION

Figure 1:
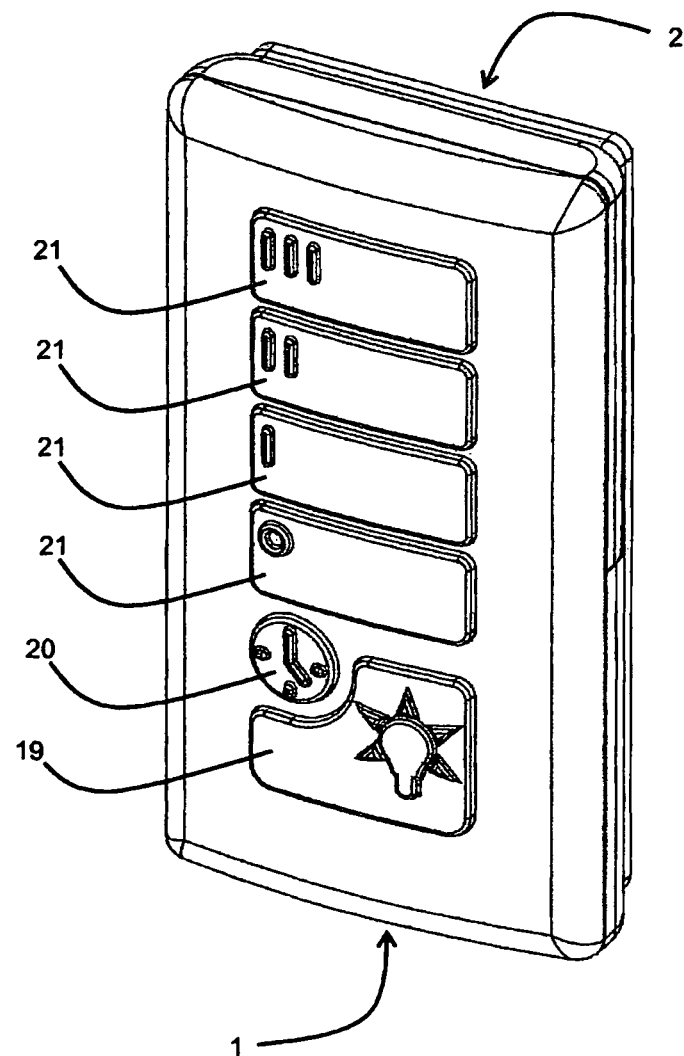
FIG. 1 is a perspective view of a handheld remote control unit.

In the following detailed description, like reference numerals and characters may be used to designate identical, corresponding, or similar components in differing drawing figures.

Referring to FIG. 1, a handheld remote control unit 1 is docked on a docking station 2, held to the docking station by magnetic attraction between magnetic and magnetically susceptible elements located within a shell 24 for the handheld remote control unit 1 and under the exposed surface of the docking station 2. Handheld remote control unit 1 is illustrated as an accessory for a remotely controlled ceiling fan (not shown). Located on the exterior of the shell 24 is a light control switch 19, a fan direction control button 20 and a plurality of fan speed control buttons 21. Handheld remote control units of various types may be employed for a variety of other functions and illustration of the present embodiment as providing control over a fan serves an illustrative function only. Handheld remote control unit 1 may be detached or undocked from the docking station 2 by an individual grasping the handheld remote control unit 1 and lifting it away the docking station.

Figure 2:
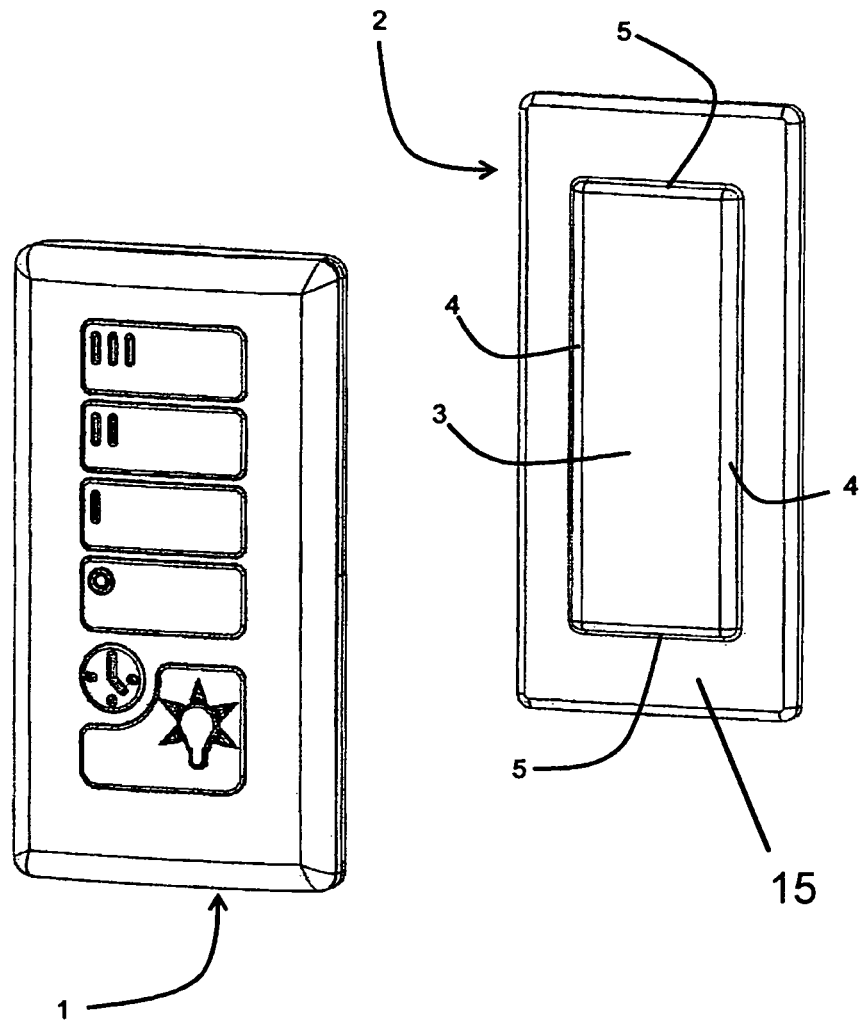
FIG. 2 is a perspective view of the handheld remote control unit of FIG. 1 and a remote control unit docking plate which may be mounted on a wall or supported from some other usually vertically aligned surface.
Figure 6:
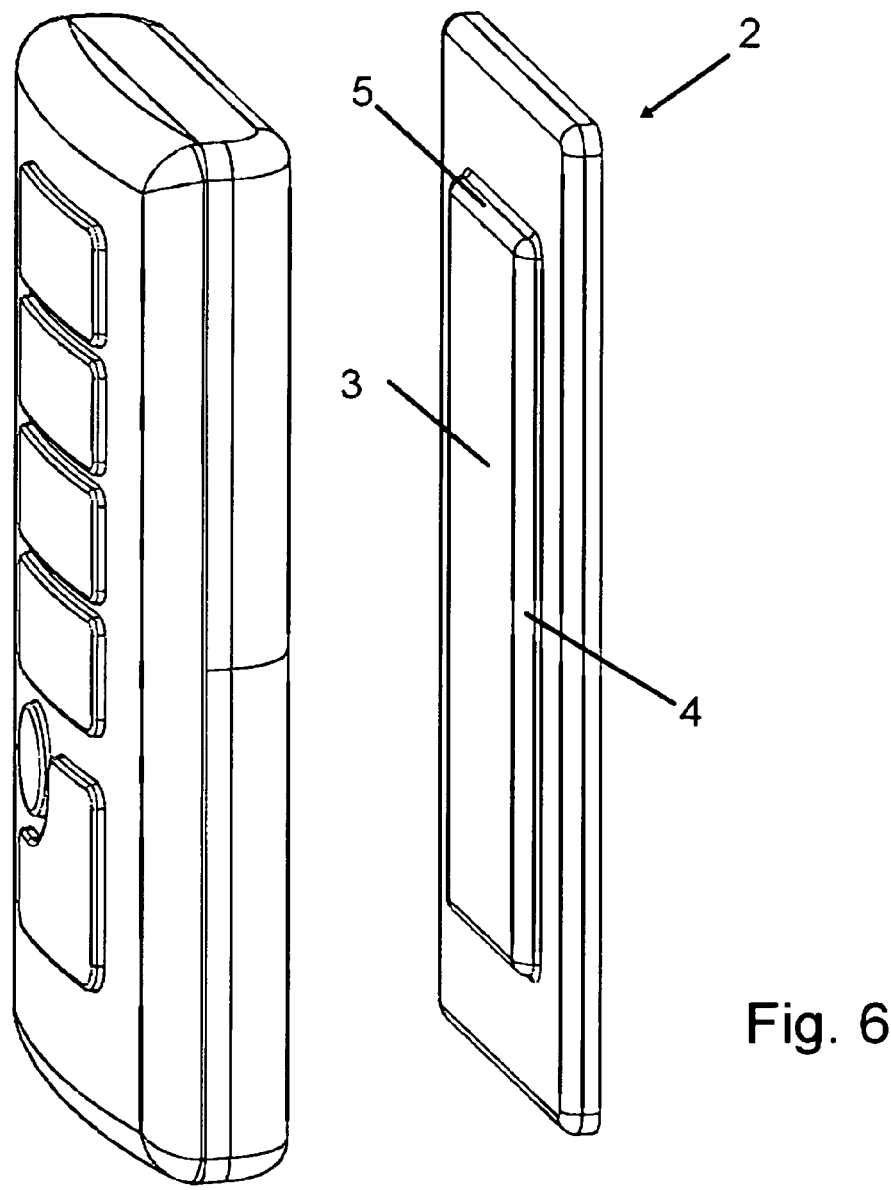
FIG. 6 is a side view of the docking plate and remote control unit.

Referring to FIGS. 2 and 6, handheld remote control unit 1 is shown displaced from docking station 2, exposing a docking surface 15 against which the shell 24 of the handheld remote control unit is held when the handheld remote control unit is docked. Docking surface 15 includes a central raised surface 3 which is generally rectangular in extent and which is defined by raised edges 4, 5 which serve as guides to restrain the handheld remote control unit 1 from motion in the plane of the central raised surface 3. The raised edges serve as a pair of horizontal alignment guides 4 and a pair of vertical alignment guides 5. The "horizontal" and "vertical" alignments correspond to the expected orientation of the docking station 2 when mounted to a wall or similar base. It is not necessary that the alignment guides actually be horizontally and vertically oriented as long as they respective pairs are at substantially right angles to one another. The vertical alignment guides 5 restrict vertical movement of a docked handheld remote control unit 1 and the horizontal alignment guides 4 restrict horizontal movement of an exterior shell 24 of the docked handheld remote control unit 1.

Docking station 2 is usually a structure which is attached to a wall, however, docking station 2 is not necessarily an independent structure. Docking station 2 could, in some applications, be an embossed region on the case of larger device, for example the case of a television set.

Figure 3:
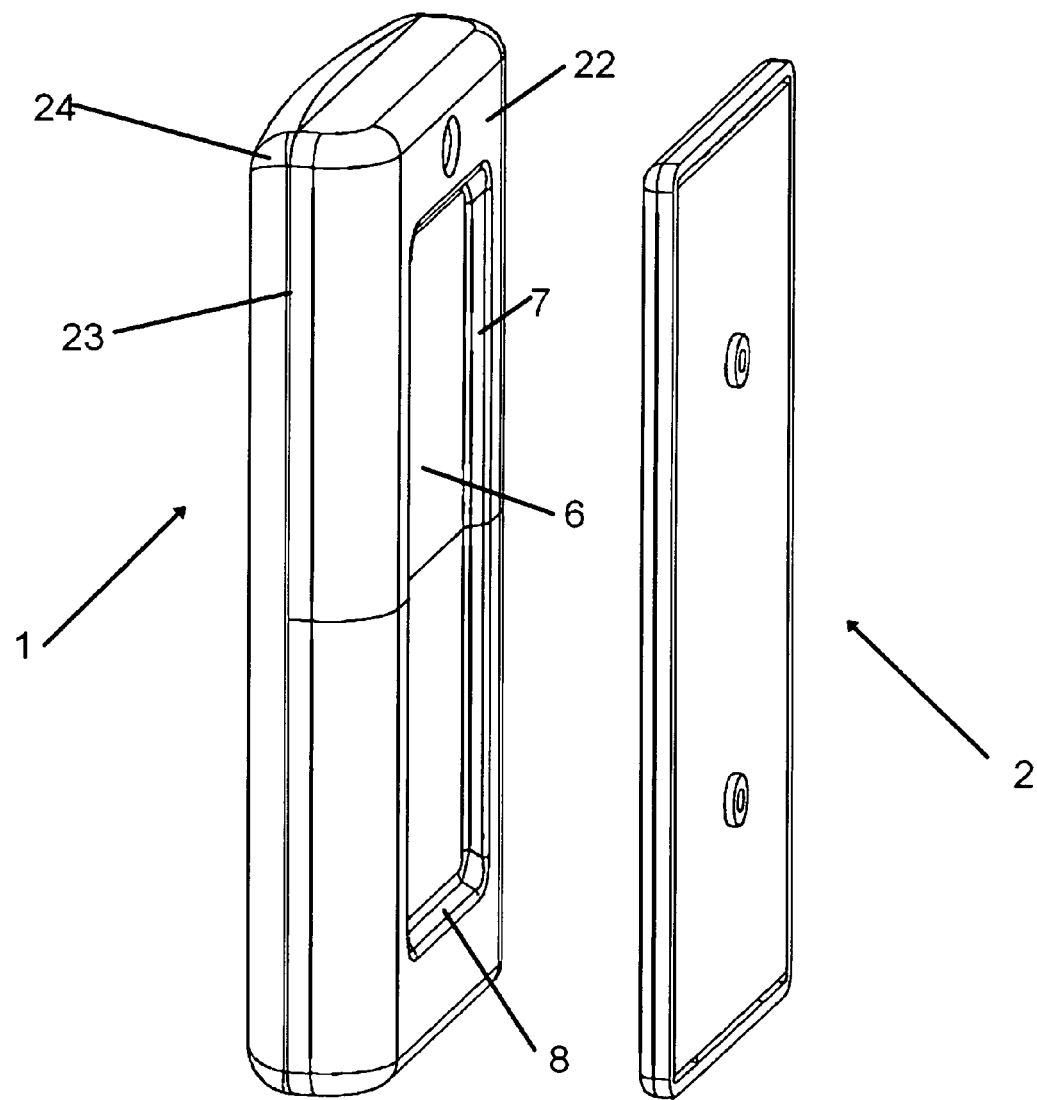
FIG. 3 is a reverse angle perspective view of the handheld remote control unit of FIG. 1 and the remote control unit docking plate of FIG. 2.

Reference to FIG. 3 illustrates a reverse surface 22 of exterior/handheld shell 24 of the handheld remote control unit 1. Reverse surface 22 is shaped to conform to the contour of the docking surface 15 of docking station 2. Together the reverse surface 22 and the docking surface 15 serve as part of a docking and support system for the handheld remote control unit 1. Centered on reverse surface 22, and inwardly displaced from the perimeter edge 23 of the shell 24, is a rectangular recessed pocket 6 which is sized to receive the central raised surface 3. Recessed pocket 6 is bordered by pairs of recessed vertical alignment guides 8 and recessed horizontal alignment guides 7 and is surrounded by a contiguous flat area of the reverse surface. Recessed pocket 6 is sized to fit snugly around raised surface 3 of the docking station 2 with the shell 24 centered on the docking station 2. The reverse surface 22 and the docking surface 15 have inverse conformed contours which align the handheld shell 24 over the docking station 2 while minimizing the degree to which the handheld shell 24 extends from a wall or surface when docked. When docked the handheld remote control unit 1 essentially completely covers the docking surface 15.

Figure 4:
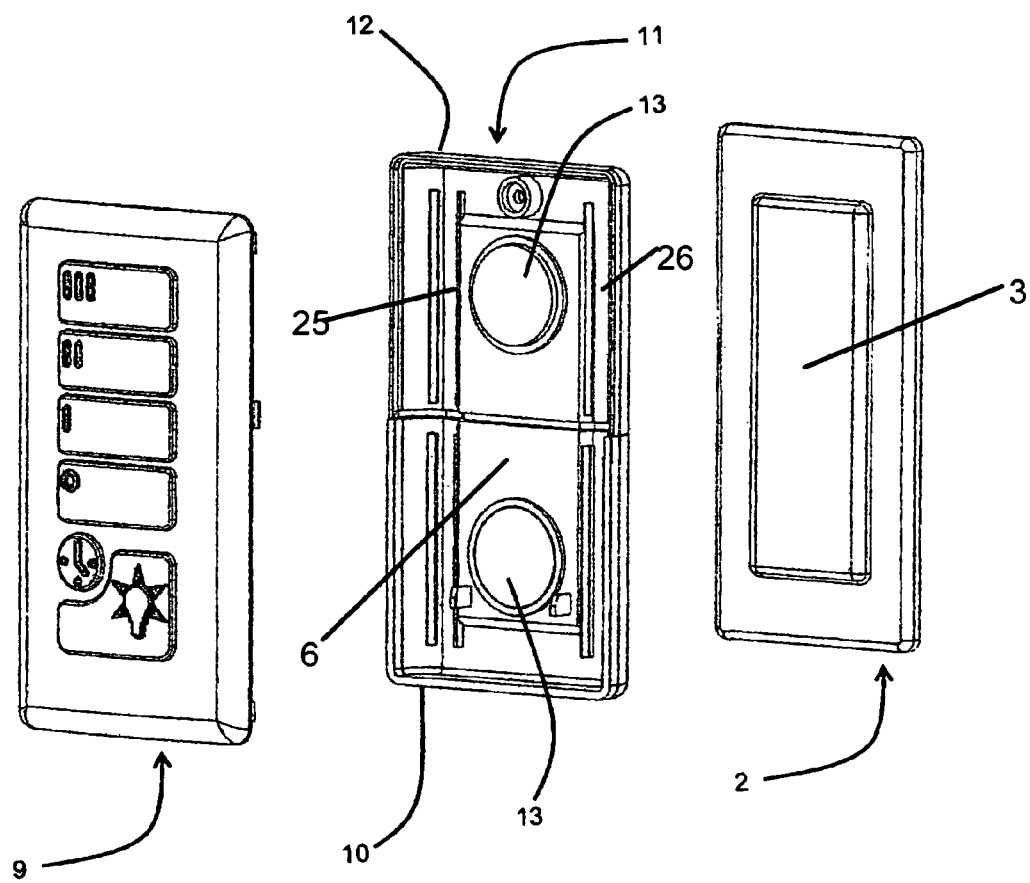
FIG. 4 is another perspective view from the angle of FIG. 2 with the remote control unit exploded.

Referring to FIG. 4, the shell 24 is constructed from a rear half shell assembly 11 and a front half shell assembly 9. The rear half shell assembly 11 includes a back cover 12 which includes an integral battery compartment door 10. An interior face 25 of the rear half shell assembly defines a space between recessed pocket 6 and the outside edge of the rear half shell assembly 11 which forms parts of a battery compartments 26. The spaces are parallel to the longitudinal axis of the back cover 12.

Figure 7:
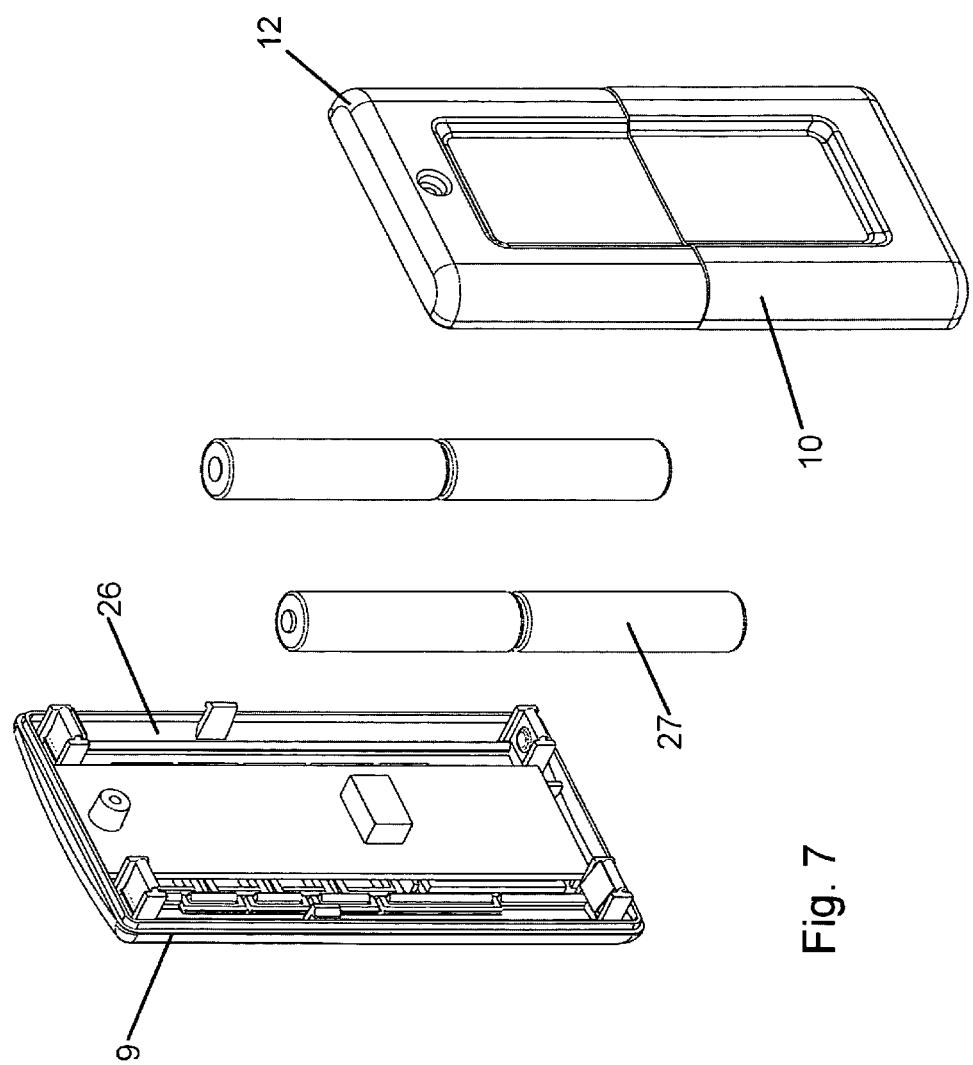
FIG. 7 is another exploded view of the remote control unit illustrating battery positioning.
Figure 8:
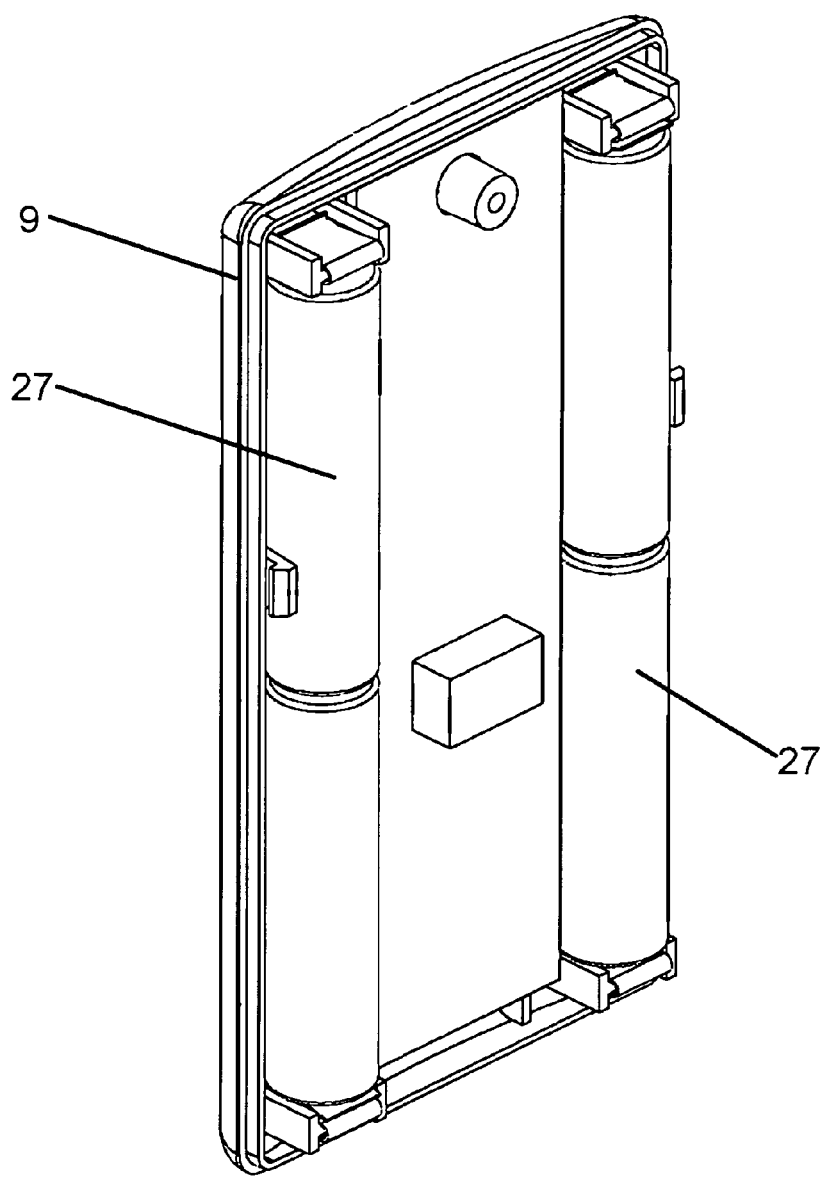
FIG. 8 is a perspective view of positioning of batteries in a battery compartment.
Figure 10:
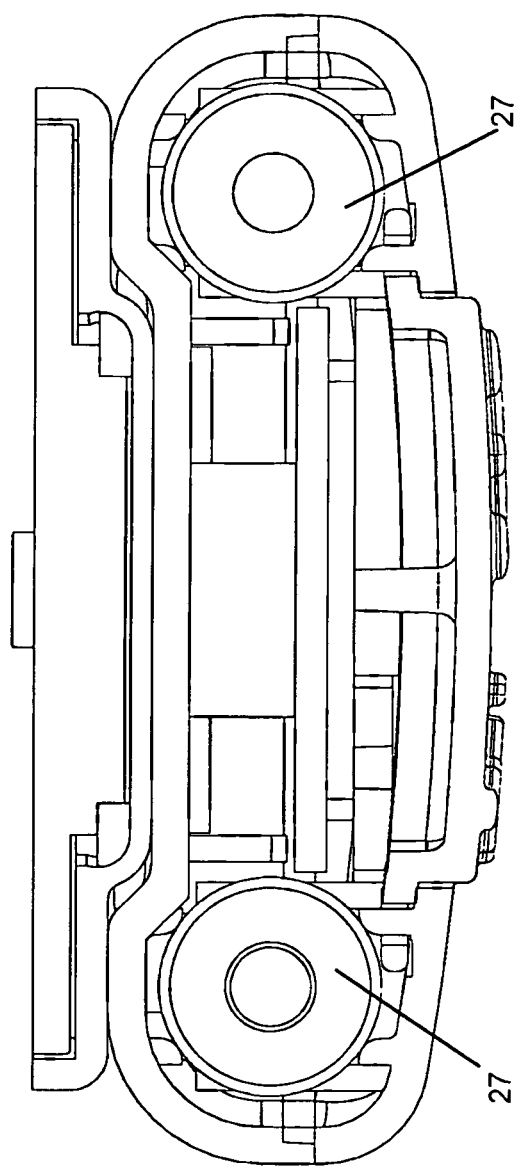
FIG. 10 is a latitudinal cross sectional view of a handheld remote control unit docked on a docking plate.

A pair of button magnets 13 are applied to the interior face 25 beneath the recessed pocket 6 relative to the exterior of the handheld shell 24. As an alternative embodiment the button magnets 13 may be replaced by buttons made of a unmagnetized but still magnetically susceptible material. Increased weight supporting capacity is obtained by providing that buttons 13 and plates 16 are both magnetized. Location of the batteries 27 to the sides of recessed pocket 6 allows the depth of the handheld shell 24 to be kept at a minimum to enclose the diameter the batteries 27, here size AA batteries (See FIGS. 7 and 8 and 10). The depth of the handheld shell 24 in the region corresponding to the recessed pocket 6 is reduced to minimize the projection of the docked handheld unit 1 from a wall by the depth of the recessed pocket (See FIG. 10). Batteries 27 are located along the elongated sides of the rectangularly shaped recessed pocket 6 after positioning in elongated battery compartments 26 located on the interior face of front case cover 9 allowing them to be located closer to the ultimate supporting wall than the magnetic buttons 13. As shown in FIG. 7, battery cover door 10 may be provided by splitting case back 12.

Figure 5:
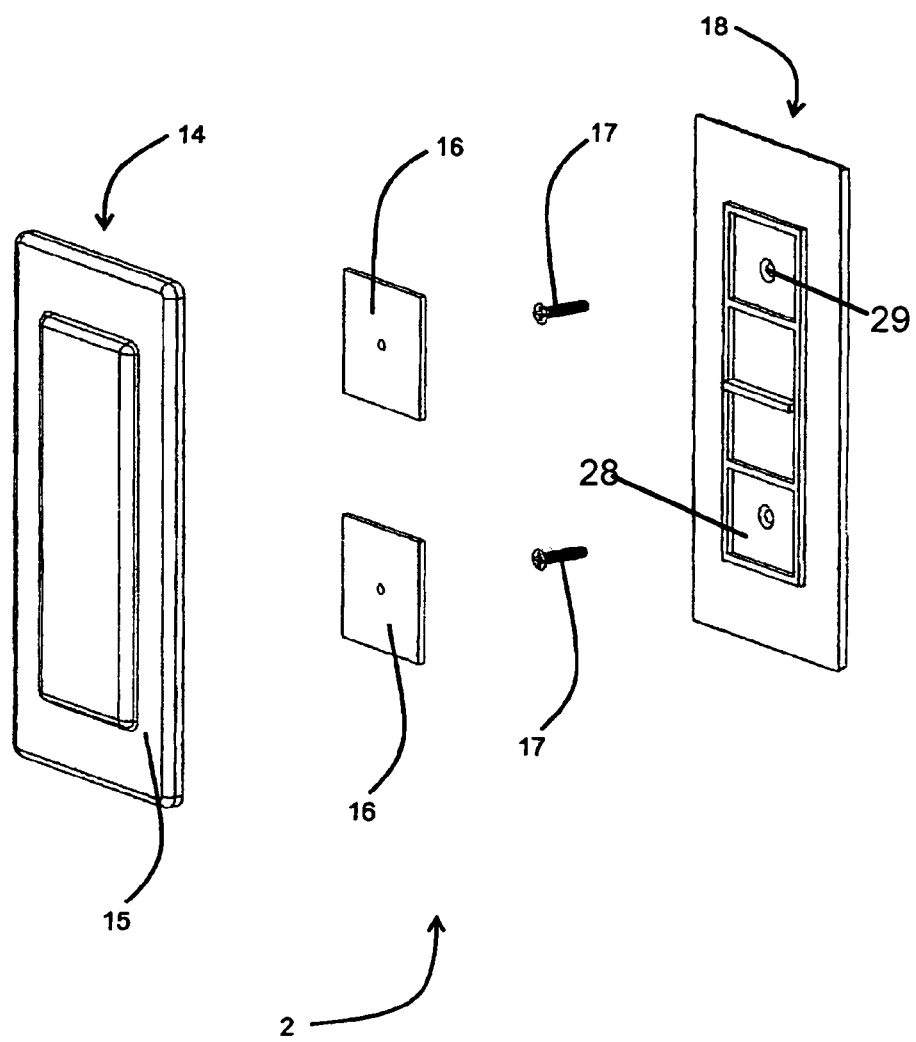
FIG. 5 is an exploded perspective view of the docking plate.
Figure 9:
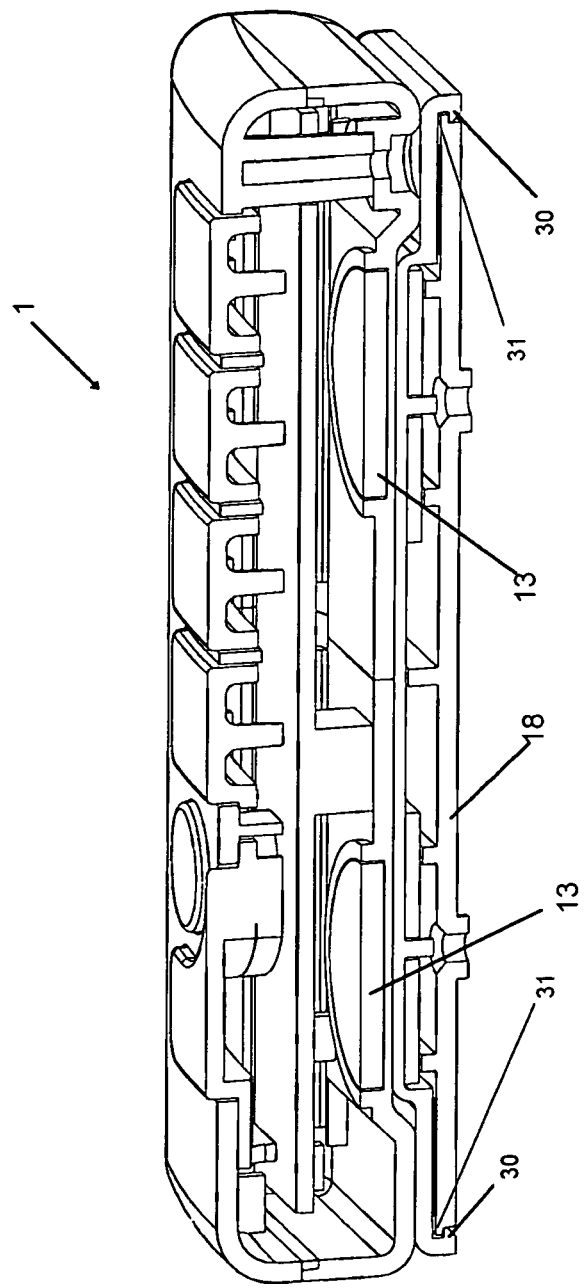
FIG. 9 is longitudinal cross sectional view of a handheld remote control unit docked on a docking plate.

Referring to FIG. 5, docking station 2 is suitable for application to a wall. Adaptations relating to providing support from a wall include a mounting plate 18. A pair of holes 29 are provided through mounting plate 18 through which flat head screws 17 may be inserted. Mounting plate 18 carries a plurality of rectangular slots 28 sized to receive and locate thin tabs or plates 16 which are made of steel or some other magnetically susceptible material, or alternatively, which may be magnets. Plates 16 are applied to the back of docking station cover 14. Metal plates 16 are applied to the reverse face of docking station cover 14. A docking station cover 14 snaps over to mounting plate 18. Snap tabs 30 may be provided along the top and bottom edges of docking station cover 14 which cooperate with corresponding edge retaining latches 31 on opposite ends of mounting plate 18 to retain the docking station cover in place (see FIG. 9). Snap tabs 30 are beveled and docking station cover made flexible enough to allow the docking station cover 14 to be pressed into place on the mounting plate 18. Where docking surface 15 is simply embossed onto the case of a article the magnetically susceptible plates 16 may be applied by adhesive under the contact surface rather than on a mounting plate 18.

Docking station 2 resembles a common switch box cover plate when the handheld remote control unit 1 is undocked. Docking station 2 also exhibits minimal projection away from a wall while providing positive alignment guides for the cooperative magnetic elements in the docking station 2 and in the handheld shell 24. The package allows the handheld remote control unit 1 to appear to float alongside the wall when docked, and when removed leaves an unobtrusive rectangular panel which may be neutrally colored to minimize obtrusiveness.

What is claimed is:

1. An article docking system comprising:
a handheld shell having a major reverse surface;
a docking surface;
cooperative magnetic elements located within the handheld shell and under the docking surface to retain the handheld shell against the docking surface when aligned thereon;
the major reverse surface and the docking surface having inverse conformed contours for aligning the handheld shell over the docking surface;
a docking station having a wall mounting plate and a docking station cover which snap fits over the wall mounting plate; and,
the docking surface forming a major exterior surface of the docking station cover.

2. The article docking system claimed in claim 1, further comprising: the major reverse surface comprising a rectangularly shaped recessed pocket surrounded by a flat contiguous surface.

3. The article docking system claimed in claim 2, further comprising: battery compartments located in the handheld shell between sides of the recessed pocket and an exterior perimeter of the handheld shell.

4. The article docking system claimed in claim 2, further comprising: permanent magnets located within the handheld shell adjacent the recessed pocket.

5. A detachable magnetic docking system for a handheld device, the system comprising:
a docking plate having a major surface;
a shell for the handheld device having a reverse surface;
the major surface and the reverse surface being contoured to mate when adjacent one another to align the shell over the docking plate;
cooperative magnetic elements located in the docking plate and in the shell to retain the handheld device on the docking plate:
the contour of the major surface including a recessed area;
the handheld device having internal battery compartments;
magnetically susceptible plates located in the docking station;
permanent magnets located within the handheld device adjacent the recessed area;
the recessed area being rectangular in shape with edges parallel to edges of the handheld device; and,
battery compartments located within the handheld device between the recessed area and the edges of the handheld device.

* * * * *